United States Patent Office 3,651,222
Patented Mar. 21, 1972

3,651,222
NEMATOCIDAL USE OF SUBSTITUTED DIMETHYLSULFONIUM TETRAPHENYLBORATES
Abron B. Gee, St. Louis, Mo., assignor to Monsanto Company, St. Louis, Mo.
No Drawing. Filed Sept. 15, 1969, Ser. No. 858,181
Int. Cl. A01n 9/12
U.S. Cl. 424—185          8 Claims

ABSTRACT OF THE DISCLOSURE

Nematocidal use of substituted dimethylsulfonium tetraphenylborates which are produced by reacting a substituted dimethylsulfonium halide with a sodium tetraphenylborate.

---

This invention relates to the use of substituted dimethylsulfonium tetraphenylborate salts to control parasitic worm life in soil and in animals, and more particularly to the control of parasitic worm life belonging to the phylum Nemathelminthes.

Parasitic worms of the phylum Nemathelminthes, class Nematoda, are unsegmented round worms found in the digestic system of animals, and in soil, where they attack the roots, stems, leaves, or ears of cultivated plants causing serious deterioration or complete loss of the plant. Thus, means for eradication or adequate control of these pests is desired. Illustrative nematodes (round worms) include *Turbatrix aceti*, DD–136, *Meloidogne incognita* and *Haemonchus contortus*.

The term "animal" as used herein and in the appended claims includes, for example, ruminants such as deer, goats, camels, sheep and cattle, monogastrics such as swine, rabbits, dogs, cats and hamsters, poultry such as chickens, turkeys, geese, ducks, guinea fowl, pigeons and pheasants, birds, such as parrots, canaries and parakeets, and the like.

In accordance with this invention a method is provided for the control of nematodes which comprises contacting said nematodes with an effective amount of one or more of a substituted dimethylsulfonium tetraphenylborate of the formula

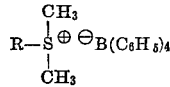

wherein R is selected from the group consisting of alkyl having a maximum of 4 carbon atoms, alkenyl having at least 3 carbons and a maximum of 6 carbon atoms and a substituted benzyl of the formula

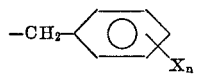

wherein X is selected from the group consisting of nitro, halogen, alkyl having a maximum of 4 carbon atoms, and $n$ is an integer from 0 to 3.

Typical substituted dimethyl sulfonium tetraphenylborates applicable for use in the present invention include:

Allyl-dimethylsulfonium tetraphenylborates,
(4-nitrobenzyl)-dimethylsulfonium tetraphenylborates,
benzyl-dimethylsulfonium tetraphenylborates,
propyl-dimethylsulfonium tetraphenylborates,
isopropyl-dimethylsulfonium tetraphenylborates,
(2,4-dinitrobenzyl)-dimethylsulfonium tetraphenylborates,
(2,4,6-dinitrobenzyl)-dimethylsulfonium tetraphenylborates,
(4-methylbenzyl)-dimethylsulfonium tetraphenylborates,
(2,4-dimethylbenzyl)-dimethylsulfonium tetraphenylborates,
(2,4,6-trimethylbenzyl)-dimethylsulfonium tetraphenylborates,
(2,4-diiodobenzyl)-dimethylsulfonium tetraphenylborates,
(2,4,6-trichlorobenzyl)-dimethylsulfonium tetraphenylborates,
(3,4-dichlorobenzyl)-dimethylsulfonium tetraphenylborates,
tertiary-butyl-dimethylsulfonium tetraphenylborates,
ethyl-dimethylsulfonium tetraphenylborates,
(4-chlorobenzyl)-dimethylsulfonium tetraphenylborates,
trimethylsulfonium tetraphenylborates, In general the compounds of the present invention can be prepared by conventional methods, such as the reaction between a compound of the formula

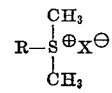

wherein X is a halogen selected from the group consisting of Cl, Br, and I, and R is as previously defined; with a compound of the formula $Na^+B(C_6H_5)_4^-$.

The preparation of the starting compounds are known in the art. Substituted dimethyl sulfonium halides, such as (4-nitrobenzyl)-dimethylsulfonium bromide, can easily be prepared by reacting equimolar portions of dimethylsulfide and α-bromo-p-nitrotoluene. The other starting compound, sodium tetraphenylborate, is readily available commercially.

Suitable solvents for the preparation of the compounds of this invention are water, methanol, ethanol or a water-ethanol mixture. The reaction is usually conducted in the approximate temperature range of 15° C. to 35° C., the preferred temperature range being approximately room temperature. In general, the molar ratios of the reactants may vary, however in the preferred method of operation, substantially equimolecular ratios of the reactants are used.

The compounds of this invention are effective in controlling parasitic round worm infestation in soil, plants and animals. These nematocide agents are particularly useful in the control of parasitic worm life, since they effectively control the parasites at each stage of their life cycles, for example, eggs, larvae, and adult worms, and at concentrations not injurious to the host plant or animal. These nematocide agents can conveniently and safely be used for the treatment of nematodes in animals, and when thus used, said nematocide agents are referred to as anthelmintic agents.

In accordance with the method of this invention the nematocide agents can be used alone or in combination with one or more solid or liquid adjuvants including diluents, extenders, carriers, and conditioning agents to provide compositions in the form of particulate solids, granules, pellets, solutions, dispersions or emulsions. Typical solid or liquid adjuvants include, for example, particulate solids, solvent liquids of organic origin, water, wetting agents, dispersing agents, emulsifying agents or any suitable combination of these, the particular adjuvant or adjuvants used being dependent upon whether the active agent is to be administered to animals or to soil. These combinations are known to those skilled in the art.

Suitable solvent liquids include, hydrocarbons such as benzene, toluene, xylene, kerosene, diesel oil, fuel oil, and petroleum naphtha, ketones such as acetone, methyl ethyl ketone and cyclohexanone, and alcohols such as ethanol, isopropanol and amyl alcohol and the like. Suitable particulate solids include talc, pyrophyllite, synthetic fine silica, attaclay, kieselguhr, chalk, diatomaceous earth, lime, calcium carbonate, bentonite, fuller's earth, cottonseed hulls, wheat flour, soyabean flour, pumice, tripoli, wood flour, walnut shell flour, redwood flour and lignin, and the like. Suitable wetting agents include alkyl sulfonate salts, alkylaryl sulfonate salts, alkyl sulfate salts, alkylamide sulfonate salts, alkylaryl polyether alcohols, fatty acid esters of polyhydric alcohols and the alkylene oxide addition products of such esters, and addition products of long chain mercaptans and alkylene oxides. Typical examples of wetting agents include the sodium alkyl benzene sulfonates having 14 to 18 carbon atoms in the alkyl group, alkylphenol-ethylene oxide condensation products, e.g., p-isooctylphenol condensed with 10 ethylene oxide units, soaps, e.g., sodium stearate and potassium oleate, sodium salt of propylnaphthalene sulfonic acid (di-2-ethyl hexyl) ester of sodium sulfosuccinic acid, sodium lauryl sulfate, sodium salt of the sulfonated monoglyceride of cocoanut fatty acids, sorbitan sesquioleate, lauryl trimethyl ammonium chloride, octadecyl trimethyl ammonium chloride, polyethylene glycol ether, polyethylene esters of fatty acids and rosin acids, sodium N-methyl-N-oleyl-taurate, Turkey red oil, sodium dibutyl naphthalene sulfonate, sodium lignin sulfonate (Marasperse N), polyethylene glycol stearate, sodium dodecylbenzene sulfonate, tertiary dodecyl polyethylene glycol thioether (Nonionic 218), long chain ethylene oxide propylene oxide condensation products, sorbitan monolaurate, polyethylene glycol ester of tall oil acids, sodium octylphenoxyethoxyethyl sulfate, tris (polyoxyethylene) sorbitan monostearate (Tween 60), sodium dihexyl sulfosuccinate, and the like.

The solid and liquid formulations can be prepared by any of the conventional methods. Thus the active ingredient can be mixed with the solid carrier in finely divided form in amounts small enough to preserve the free-flowing property of the final dust composition.

When treating nematodes in soil and plant systems in accordance with this invention, the nematode agents are preferably applied as granules, emulsifiable concentrate, or as dust formulations. These nematocidal agents are usually applied to soil in the treatment of nemathelminthes at a rate from about 0.001 to about 50 pounds per acre.

Veterinary application of the anthelmintic agents in accordance with this invention can be carried out with anthelmintic compositions in the form of a liquid drench, suitably formulated tablets or capsules, or animal feed compositions. The anthelmintic agents can be incorporated into any of the general types of feed rations conventionally fed to animals, e.g., dry laboratory chow diets, moist, semi-solid diets, relatively dry grain forage mixtures, and the like, as well as in the drinking water taken in by the animal to be treated. In the treatment of animal parasitic worms the anthelmintic agents are preferably administered orally as a liquid drench or tablet or capsule in unit dosage form. Alternatively, these anthelmintic agents can be incorporated into urea or salt licks or blocks.

In the practice of this invention the anthelmintic agent can be used in veterinary compositions to control parasitic infestations in animals. The dosage level desired will depend upon such factors as the type of composition, type of host animal to be treated, and the severity of the parasitic infestation. Generally these anthelmintic agents are employed in an amount from about 5 mg./kg. to about 100 mg./kg. of body weight of the treated animal.

The anthelmintic agents used in this invention also can be applied to the parasitic infestations in admixture with other anthelmintics, medicaments, vitamin additive mixtures, and the like.

The following examples will illustrate the invention. Parts and percent are by weight unless otherwise indicated.

EXAMPLE 1 p-Nitrobenzyl-dimethylsulfonium bromide was prepared according to the following procedure:

To a suitable vessel was added 19 parts of methyl sulfide and 65 parts of α-bromo-p-nitrotoluene. The mixture was cooled overnight and allowed to stand for approximately 24 hours. The resultant solid was dissolved in hot ethanol, cooled, and the solid filtered, dried, recrystallized from methanol-ether, filtered again and dried to give a 40% yield of p-nitrobenzyl-dimethylsulfonium bromide, M.P. 109–110° C.

EXAMPLE 2

Benzyl-dimethylsulfonium tetraphenylborate was prepared according to the following procedure:

To a suitable vessel charged with a solution of 14 parts of benzyl-dimethylsulfonium bromide dissolved in methanol, was added, with stirring a solution of approximately 21 parts of sodium tetraphenyl borate dissolved in methanol. The white solid which formed immediately was filtered and recrystallized from acetonitrile, —M.P. 188–189° C.

Analysis.—Calc'd for $C_{33}H_{33}BS$ (percent): C, 76.59; H, 6.23. Found (percent): C, 76.36; H, 6.18.

EXAMPLE 3

To a suitable vessel charged with a solution of 15 parts of p-nitrobenzyl-dimethylsulfonium bromide dissolved in methanol, was added with stirring a solution of approximately 19 parts of sodium tetraphenyl-borate in methanol. The cream colored solid which formed immediately was filtered and the precipitate dissolved in hot acetone. The hot acetone solution was filtered, cooled, and ethanol added to the filtrate until the filtrate became cloudy. The resultant mixture was cooled. The solid formed was removed by filtration, and dried yielding the desired product, a yellow powder —M.P. 203°–205° C.

Analysis.—Calc'd for $C_{33}H_{32}BNO_2S$ (percent): C, 76.59; H, 6.23. Found (percent): C, 76.36; H, 6.18.

EXAMPLE 4

In this example, the effectiveness of the compounds of this invention against the soil saprophytic nematode, *Turbatrix aceti* is demonstrated.

Three tenths ml. aliquots of the hereinbelow recited dimethylsulfonium tetraphenylborates in water concentrations of 10 p.p.m., 30 p.p.m., and 100 p.p.m. are placed in vials. To each vial are added approximately 135–200 *Turbatrix aceti* nematodes. The vial is capped and incubated for 1 week at room temperature, and thereafter mortality counts are made and recorded as shown in Table I.

The nematocidal activity index used in this example is based on the percent mortality of the *Turbatrix aceti*, and is defined as follows:

| Numerical Scale: | Nematocidal activity |
|---|---|
| 1 | 100% mortality. |
| 2 | 100% mortality. |
| 5 | Less than 85% mortality. |

TABLE I

| Compounds | Mortality of *Turbatrix aceti* (p.p.m.) | | |
|---|---|---|---|
| | 100 | 30 | 10 |
| Benzyl-dimethylsulfonium tetraphenylborate | 1 | 2 | 5 |
| p-Nitrobenzyl-dimethylsulfonium tetraphenylborate | 2 | 2 | 2 |
| Allyl-dimethylsulfonium tetraphenylborate | 2 | 2 | 2 |
| t-Butyl-dimethylsulfonium tetraphenylborate | 1 | 2 | 5 |
| 2,4-dichlorobenzyl-dimethylsulfonium tetraphenylborate | 2 | 5 | 5 |
| 3,4-dichlorobenzyl-dimethylsulfonium tetraphenylborate | 2 | 5 | 5 |
| Ethyl-dimethylsulfonium tetraphenylborate | 2 | 2 | 2 |
| p-Chlorobenzyl-dimethylsulfonium tetraphenylborate | 2 | 2 | 2 |
| Methyl-dimethylsulfonium tetraphenylborate | | | 1 |

EXAMPLE 5

In this example, the effectiveness of the compounds of the invention against the parasitic nematode DD–136, an unclassified parasitic nematode belonging to the family steinernematodae, is demonstrated.

Two tenths ml. aliquots of the hereinbelow recited dimethylsulfonium tetraphenylborates in water concentrations of 10 p.p.m., 30 p.p.m., and 100 p.p.m. are placed in vials. One and eight tenths ml. aliquots of melted sensitivity agar (Sensitivity test Medium CM-215 Colab Laboratories Inc., Chicago Heights, Ill.) is added to the vials. To each vial are added approximately 50 to 100 DD-136 nematodes. The vial is capped and incubated at 68° F. for two weeks, and thereafter mortality counts are made and recorded as shown in Table II.

The nematocidal activity index used in this example is based on the percent mortality of the DD-136, and is defined as follows:

| Numerical scale: | Nematocidal activity |
|---|---|
| 1 | 100% mortality. |
| 2 | 85–99% mortality. |
| 5 | Less than 85% mortality. |
| 6 | Only adults survive. |

TABLE II

| Compounds | Mortality of DD-136 (p.p.m.) | | |
|---|---|---|---|
| | 100 | 30 | 10 |
| Benzyl-dimethylsulfonium tetraphenylborate | 1 | 1 | 6 |
| p-Nitrobenzyl-dimethylsulfonium tetraphenylborate | 1 | 1 | 1 |
| Allyl-dimethylsulfonium tetraphenylborate | 1 | 1 | 1 |
| t-Butyl-dimethylsulfonium tetraphenylborate | 1 | 1 | 1 |
| 2,4-dichlorobenzyl-dimethylsulfonium tetraphenylborate | 5 | 5 | 5 |
| 3,4-dichlorobenzyl-dimethylsulfonium tetraphenylborate | 5 | 5 | 5 |
| Ethyl-dimethylsulfonium tetraphenylborate | 1 | 1 | 1 |
| p-Chlorobenzyl-dimethylsulfonium tetraphenylborate | 5 | 5 | 5 |
| Methyl-dimethylsulfonium tetraphenylborate | | 1 | 1 |

EXAMPLE 6

In this example, the effectiveness of the compounds of the invention in preventing galling of plants in soil infested with the root-knot nematode, *Meloidogyne incognita acrita* is demonstrated.

The dimethylsulfonium tetraphenylborates is mixed thoroughly into soil in an aqueous carrier at rates not exceeding 20 p.p.m. of active ingredient in the soil. After the compound is mixed in the soil, an aliquot containing approximately 500 nema of the root-knot nematode, *Meloidogyne incognita acrita* is inoculated into the root zone of each pot. Seedling-squash plants are then transplanted into each pot. After standing for a period of approximately 21 days, the squash plant roots are washed free of soil and rated according to the root-knot galling present.

The root-knot activity of a compound used in the example is based on the percent reduction of knots of the test plants as compared to the control plants, and is defined as follows:

| Numerical scale: | Root-knot activity |
|---|---|
| 1 | 100% reduction of root-knots over control plants. |
| 2 | 85% to 99% reduction of root-knots over control plants. |
| 5 | Less than 85% reduction of root-knots over control plants. |

| Compound | Reduction of root-knots at p.p.m.— | |
|---|---|---|
| | 20 | 10 |
| Methyl-dimethylsulfonium tetraphenylborates | 1 | 5 |
| Benzyl-dimethylsulfonium tetraphenylborates | | 1 |
| Allyl-dimethylsulfonium tetraphenylborates | | 1 |

EXAMPLE 7

The anthelmintic efficiency of the representative substituted dimethylsulfonium tetraphenylborates was determined against the parasitic nematode *Haemonchus contortus* in the following manner. Ten lambs are wormed with thiabendazole (88 mg./kg.) prior to their inoculation with *Haemonchus contortus* larvae. For two weeks, they are held in "dry lots" to prevent reinfestation. The lambs are then inoculated intraruminally or by per os administration with larvae of *Haemonchus contortus*. Following their inoculation, the lambs are kept in dry lots for a minimum of 4 weeks, until the infection becomes evident. Individual fecal samples are then taken from each lamb in the group and the number of eggs per gram of feces (EPG) counted. Approximately 4 days later each test compound is administered to one pair of sheep at levels not exceeding 100 mg./kg. At this time a second fecal sample is taken to determine the EPG. This count is used as the pretreatment EPG. Six days following administration of the test compound, fecal samples are again taken and a post-treatment EPG is made. The percentage EPG reduction can then be determined using the pre-treatment EPG. If the average EPG reduction for the pair of lambs is 90% or greater, another fecal sample is taken 6 to 7 days later and counted to assure the EPG count remained down. Results and further details are given in Table IV.

TABLE IV

| Anthelmintic agent | Percent anthelmintic *Haemonchus contortus* EPG reduction at indicated levels of mg./kg. | | | |
|---|---|---|---|---|
| | 100 | 75 | 50 | 25 |
| Trimethylsulfonium tetraphenylborates | 95 | 92 | 90 | 74 |
| Allyl-dimethylsulfonium tetraphenylborates | 100 | | | |
| Paranitrobenzyl-dimethylsulfonium tetraphenylborates | 100 | | | |
| 3,4-(dichlorobenzyl)-dimethylsulfonium tetraphenylborates | 95 | | | |
| Tertiarybutyl-dimethylsulfonium tetraphenylborates | 99 | | | |

Although the invention is described with respect to specific modifications, the details thereof are not to be construed as limitations except to the extent indicated in the following claims.

What is claimed is:

1. A method of controlling nematodes which comprises contacting said nematodes with a nematocidally effective amount of a compound of the formula

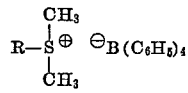

wherein R is selected from the group consisting of alkyl having from 1 to 4 carbons, alkenyl having from 3 to 6 carbons, and a substituted benzyl of the formula

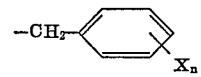

wherein X is selected from the group consisting of nitro, halogen, and alkyl having from 1 to 4 carbons, and $n$ is an integer from 0 to 3.

2. A method according to claim 1 wherein said nematodes are present in animals and are contacted with an anthelmintically effective amount of the compound administered to the animal orally.

3. A method according to claim 1 wherein said nematodes are contacted with a nematocidally effective amount of the compound in soil.

4. A method according to claim 1 wherein said compound is trimethylsulfonium tetraphenylborate.

5. A method according to claim 1 wherein said compound is allyl-dimethylsulfonium tetraphenylborate.

6. A method according to claim 1 wherein said compound is 4-nitrobenzyl-dimethylsulfonium tetraphenylborate.

7. A method according to claim 1 wherein said compound is t-butyl-dimethylsulfonium tetraphenylborate.

8. A method according to claim 1 wherein said compound is ethyl-dimethylsulfonium tetraphenylborate.

References Cited

Chemical Abstracts, vol. 55, item #23401c, 1961.

ALBERT T. MEYERS, Primary Examiner

D. J. FUNDERBURK, Assistant Examiner

U.S. Cl. X.R.

260—462